(12) United States Patent
Nestler

(10) Patent No.: US 6,307,493 B1
(45) Date of Patent: Oct. 23, 2001

(54) NON-LINEAR FUNCTION GENERATING CIRCUIT AND METHOD

(75) Inventor: Eric Nestler, Harvard, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/322,588

(22) Filed: May 28, 1999

(51) Int. Cl.[7] .................................................. H03M 3/00
(52) U.S. Cl. ............................................................ 341/143
(58) Field of Search .................................. 341/143, 118, 341/120

(56) References Cited

U.S. PATENT DOCUMENTS

| | | | |
|---|---|---|---|
| 3,953,795 | 4/1976 | Brunner et al. ...................... | 324/142 |
| 4,298,951 | 11/1981 | Hall ...................................... | 364/752 |
| 5,099,195 | 3/1992 | Greer et al. .......................... | 324/142 |
| 5,134,401 | 7/1992 | McCartney et al. ................. | 341/143 |
| 5,583,501 | * 12/1996 | Henrion et al. ..................... | 341/118 |
| 5,862,069 | 1/1999 | Nestler .......................... | 364/754.01 |

FOREIGN PATENT DOCUMENTS

| | | | |
|---|---|---|---|
| 0 296 968 A2 | 12/1988 | (EP) .......................... | G01R/21/133 |
| WO 86/03302 | 6/1986 | (WO) .......................... | G01R/21/133 |

OTHER PUBLICATIONS

Denyer et al., "VLSI Signal Processing: A Bit–Serial Approach", Addison–Wesley Publishers Limited, 1985.
Higgins, "Digital Signal Processing in VLSI" Printice–Hall, Inc., 1990, pp 533–537, Section 8.5.
Analog Devices, "Digital Signal Processing Applications Using the ADSP–2100 Family", Printice–Hall, Inc. 1990 pp 57–60.
Analog Devices, "Nonlinear Circuits Handbook", Analog Devices, Inc., Jan., 1976, pp 40.
Alcatel, "TP 11.1: A Power Metering ASIC with A Sigma–Delta–Based Multiplying ADC", 1994 IEEE International Solid–State Circuits Conference.
"Oversampling–Based Balanced Modulator", Electronics Letters, Jan. 1991, vol. 27, No. 1.
Kerth, "An Oversampling Converter For Strain Gauge Transducers", IEEE Journal of Solid State Circuits, vol. 27, No. 12, Dec. 1992.

* cited by examiner

Primary Examiner—Brian Young
(74) Attorney, Agent, or Firm—Samuels, Gauthier & Stevens, LLP

(57) ABSTRACT

Apparatus, and method, for producing a signal representative of a non-linear function of an input signal. The apparatus includes a feedback loop having a sigma-delta modulator fed by the input signal and a feedback signal, such feedback signal being a non-linear function of the output of the modulator. The output of the sigma-delta modulator is a stream of m-bit digital words. The output of the sigma-delta modulator is fed to an filter for converting the stream of m-bit digital words produced by the sigma-delta modulator into a corresponding stream of n-bit digital words. The n-bit and m-bit streams of digital words are fed to a multiplier. The multiplier produces an series of digital words, each one of the digital words representing the product of one of the n-bit digital words and a one of the n-bit digital words. The series of digital words produced by the multiplier is fed to the sigma-delta modulator as the feedback signal.

9 Claims, 1 Drawing Sheet

NON-LINEAR FUNCTION GENERATING CIRCUIT AND METHOD

BACKGROUND OF THE INVENTION

This invention relates generally to a non-linear function generating circuit and method and more particularly to digital non-linear function generating circuits and methods.

As is known in the art, many applications require that a non-linear function of a signal be generated. One circuit used for this purpose is shown in FIG. 1 to generate a square root function of an input signal, X. The circuit includes an analog multiplier M in a negative feedback loop provided around an operational amplifier A. The analog input signal, X, is fed to the non-inverting input of the amplifier A. The output Y of the amplifier A is fed to the pair of inputs of the multiplier M. Thus, the output of the multiplier M produces a signal representative of $Y^2$. The output $Y^2$ is fed to the inverting input of the amplifier A. With a large amplifier gain, in the steady state the output will be equal to:

$$\sqrt{X}$$

Such method is described on page 40 of Nonlinear Circuits Handbook, Dan Sheingold, Analog Devices, Inc.

Digital circuitry has been used to determine the square root of an input signal. One technique is described in Digital Signal Processing Applications", Prentice-Hall, 1990 [ISBN 0-13-212978-7], Section 4.4, page 57, which describes an approach based on a Taylor series expansion of the square root function. This algorithm is open loop and the square root value is available after each evaluation of the polynomial.

Another approach using a closed loop, iterative, algorithm is shown in U.S. Pat. No. 4,298,951, issued Nov. 3, 1981, entitled "Nth Root Processing Apparatus", inventor Hall.

SUMMARY OF THE INVENTION

In accordance with the invention, apparatus is provided for processing an input signal. The apparatus includes a negative feedback loop having a sigma-delta modulator fed by the input signal and a feedback signal, such feedback signal being a non-linear function of the output of the modulator.

With such an arrangement, a sigma-delta modulator, which is in many applications is available to provide digital conversion for the input signal is here adapted for use to provide an output signal representative of a non-linear function of the input signal. Thus, the circuit is able to share the same hardware (i.e. the sigma-delta modulator) which is used to provide digital conversion of the input signal. This is particularly advantageous where the digital converter and the non-linear function generating circuit are on the same integrated circuit chip.

In accordance with another feature of the invention, apparatus is provided for processing an input signal. The apparatus includes a negative feedback loop having a sigma-delta modulator fed by the input signal and a feedback signal. The output of the sigma-delta modulator is a stream of m-bit digital words. The output of the sigma-delta modulator is fed to an filter for converting the stream of m-bit digital words produced by the sigma-delta modulator into a corresponding stream of n-bit digital words. The n-bit and m-bit streams of digital words are fed to a non-linear processing unit. The non-linear processing unit produces a series of digital words, each one of the digital words representing a non-linear combination of one of the m-bit digital words and one of the n-bit digital words. The series of digital words produced by the non-linear processor is fed to the sigma-delta modulator as the feedback signal.

In accordance with still another feature of the apparatus is provided for producing a signal representative of a non-linear function of an input signal. The apparatus includes a negative feedback loop having a sigma-delta modulator fed by the input signal and a feedback signal. The output of the sigma-delta modulator is a stream of m-bit digital words. The output of the sigma-delta modulator is fed to a filter for converting the stream of m-bit digital words produced by the sigma-delta modulator into a corresponding stream of n-bit digital words. The n-bit and m-bit streams of digital words are fed to a multiplier. The multiplier produces a series of digital words, each one of the digital words representing the product of one of the M-bit digital words and one of the n-bit digital words. The series of digital words produced by the multiplier is fed to the sigma-delta modulator as the feedback signal.

With such an arrangement, in the steady state, the feedback loop drives the feedback signal towards the input signal. Because the feedback signal is the product of the same signal, i.e., the output of the modulator, Y, the feedback signal, in the steady state is driven to $Y^2=X$, where X is the input signal. Thus, in the steady state, Y represents a non-linear function of the input signal, here the square root of the input signal, X. It is noted that Y is available as an output from either the sigma-delta modulator, as a series of m-bit digital words or from the output of the filter as a series on n-bit digital words.

BRIEF DESCRIPTION OF THE DRAWING

These and other features of the invention will become more readily apparent following the detailed description when read together with the accompanying drawing, in which.

DESCRIPTION OF THE PREFERRED EMBODIMENTS

Figure 1:
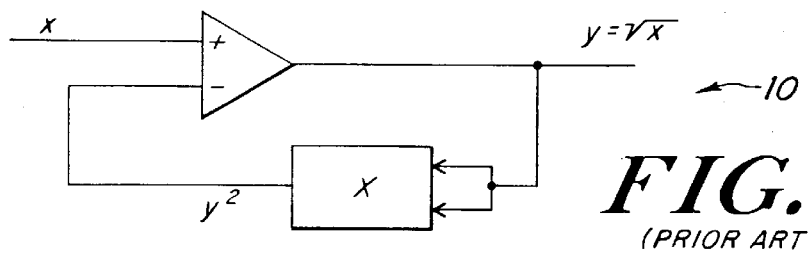
FIG. 1 is a block diagram of a square root circuit according to the PRIOR ART.
Figure 2:
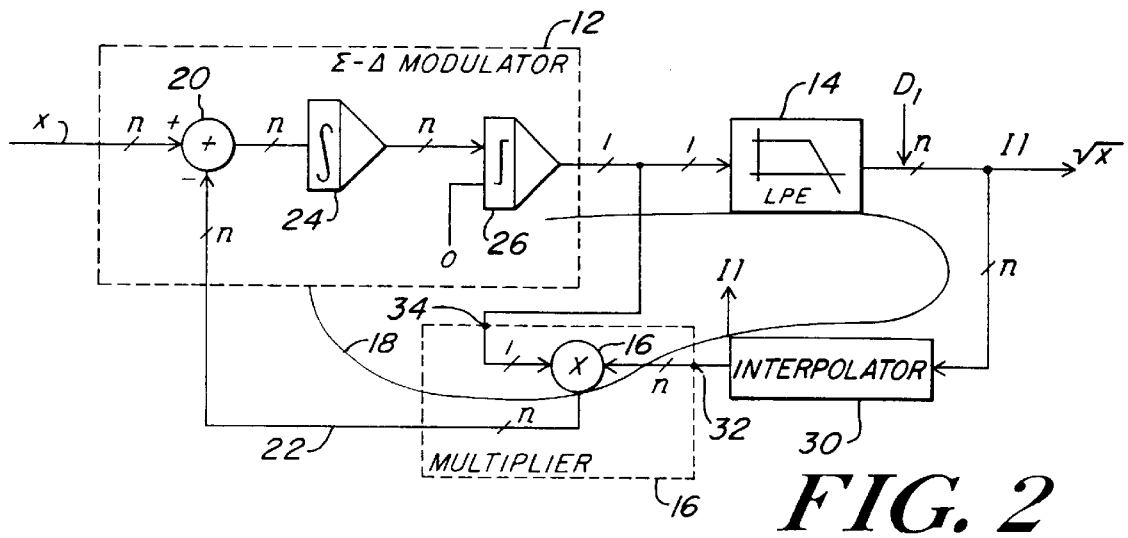
FIG. 2 is a block diagram of a square root circuit according to the invention.

Referring now to FIG. 2, apparatus 10 adapted to provide a signal representative of a non-linear function, here, for example, the square root of an input signal, X, is shown. The apparatus 10 includes a modulator 12; decimation filter 14; and multiplier 16 arranged in a negative feedback loop 18, as shown. The modulator 12 is a sigma-delta modulator (sometimes referred to as a delta-sigma modulator) having: a differencing network 20 for producing a signal representative of the difference between the input signal, X, and a feedback signal on bus 22; an integrator 24 fed by the difference signal produced by the differencing network 20; and comparator 26 fed by the integrator 24 and a reference potential, here ground, for producing a sequence of series of digital words representative of the difference between the input signal, X, and the feedback signal. The comparator 26 here produces a series of single bits. Each it is representative of a difference between an output of the integrator 24 and a predetermined level, here ground potential.

Figure 4:
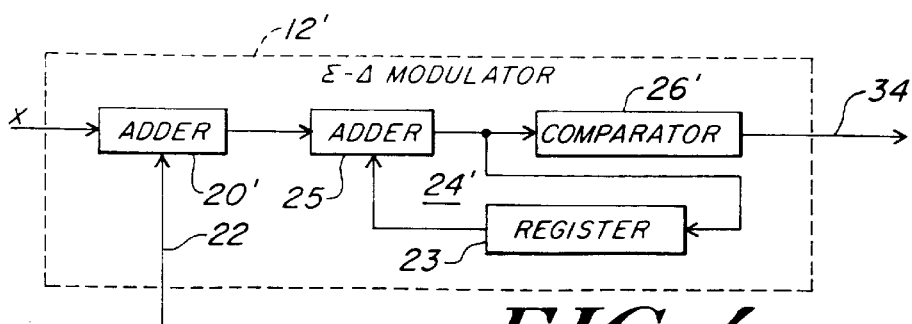
FIG. 4 is a block diagram of an alternative embodiment of a sigma-delta modulator suitable for use in the square root circuit of FIG. 2.

It should be understood that in accordance with the invention, the sigma-delta modulator 12 can be implemented in either a digital-only form, or as a mixed-signal architecture. In the mixed-signal architecture, the modulator 12, FIG. 2, is an analog-to-digital converter implemented as a sampled-capacitor sigma-delta converter, such as, for example, the sigma-delta converter described in U.S. Pat. No. 5,134,401 entitled "Delta Sigma Modulator Having Programmable Gain/Attenuation", inventor McCartney at al, issued Jul. 28, 1992, assigned to the same assignee as the present invention. In the digital-only form, the modulator 12 is implemented with digital components, as shown in FIG. 4 for sigma-delta modulator 12. Here, the input stream is a stream of digital words at a sampling rate, the error is generated by an adder 20', the integrator 24 in FIG. 2 is here an integrator 24' made up of a register 23 and adder 25 connected as shown, and the comparator 26 in FIG. 2 is here logic circuitry 26' that checks the sign bit, for example.

With either implementation, the modulator 12, or 12', each one of the digital words produced by the modulator 12, 12', is m-bits. Here, m is one. Thus, considering modulator 12 in FIG. 2, and recognizing the discussion below applies equally to the circuit 10 if modulator 12' were used in place of modulator 12, the sigma-delta modulator 12 is an oversampling sigma delta modulator that provides a one-bit output data stream at a predetermined data rate (i.e., a rate samples of the input signal, X, are fed to the modulator 12. The 1-bit output data stream of the modulator 12 is a serial stream having a logical value of "+1" or "−1". The data rate (or bit rate) of the stream of bits is equal to the sampling rate of the modulator 12 from which the stream is generated. The ratio of the number of the bits of the data stream having a value of "+1" to the number of bits in the data stream having "−1" over a given period of time provides an indication of the magnitude of the input to the modulator 12.

The decimation filter 14 is a low pass filter to remove high frequency noise produced by the modulator 12. The filter 14 also acts as a decimator and converts the 1-bit output data stream at the input to the filter 14 into an n-bit data stream. The n-bit data stream produced at the output of the filter 14 has a data rate equal to the sampling rate of the modulator 12 reduced by a decimation factor, here $D_1$, of the low pass filter. Here, for example, $D_1$ is 32.

The output of the decimation filter 14 is fed to an interpolator 30 which thus receives the n-bit data stream from the low pass filter 14 and performs up-sampling of the n-bit data stream by a factor $I_1$, here, for example, $I_1$, is 32. Here, in this example, the factor $I_1$, is equal to the factor $D_1$ and the sample rate of the modulator 12 is equal to one megahertz. Further, in this example, the n-bit data stream produced by the interpolator 30 is at the same data rate as the 1-bit data stream produced at the output of the modulator 12. In this embodiment, the output of the interpolator 30 is a 16-bit digital words (i.e., n=16) that is encoded using 2's complement numeric encoding. It should be understood that the sampling rate of the modulator 12 may be different from the data rate produced by the interpolator 30 and that other types of numeric coding can be used. It is also possible to combine the low-pass decimation filter and interpolator into one filter. Using separate elements offers the advantage that one can have different sample rates for the modulator and the output value, Y represents the square root of the input signal, X.

The decimation filter 14 is fed by the sequence series of bits of the modulator 12 and converts each of the series of m-bit digital words, (here 1-bit digital words) into a corresponding one of the sequence of n bit digital words, where n is an integer greater than m, here n is sixteen, for example. Thus, the multiplier 16 is an asymmetric multiplier of the type described in my U.S. Pat. No. 5,862,069, issued Jan. 19, 1999, entitled "Four Quadrant Multiplying Apparatus and Method", assigned to the same assignee as the present invention, the entire contents thereof being incorporated into this application by reference. That is, the multiplier 16 is asymmetric because the number of bits at one input thereof is different from the number of bits at the other input thereof.

The multiplier 16 is fed by the sequence of series of the m-bit digital words from modulator 12 and the sequence of n-bit digital words from the interpolator 30 to produce a corresponding sequence of n-bit digital words on bus 22. The sequence of n-bit digital words on bus 22 is used as the feedback signal for the modulator 12. Thus, the multiplier 16 produces a sequence of n-bit digital words on bus 22 in response to the multiplication of the series of m-bit digital words from modulator 12 bits and the sequence of n-bit digital words from the interpolator 30. The multiplier 16 produces a sequence of n-bit digital words on bus 22 in response to the multiplication of the series of single bits from modulator 12 and the sequence of n bits digital words from interpolator 30.

With such an arrangement, in the steady state, the negative feedback loop 18 drives the feedback signal on bus 22 towards the input signal, X. Because the feedback signal on bus 22 is the product of the same signal, i.e., a modulator 12 produced signal, the feedback signal on bus 22, $Y^2$, will in the steady state be driven to $Y^2=X$, where X is the input signal. Thus, in the steady state, Y represents the square root of the input signal, X. It is noted that Y is available as an output from either the output of the sigma-delta modulator 12 as a series as, here 1-bit digital words, or from the output of the filter 14 as a series on m-bit digital words.

Figure 3:
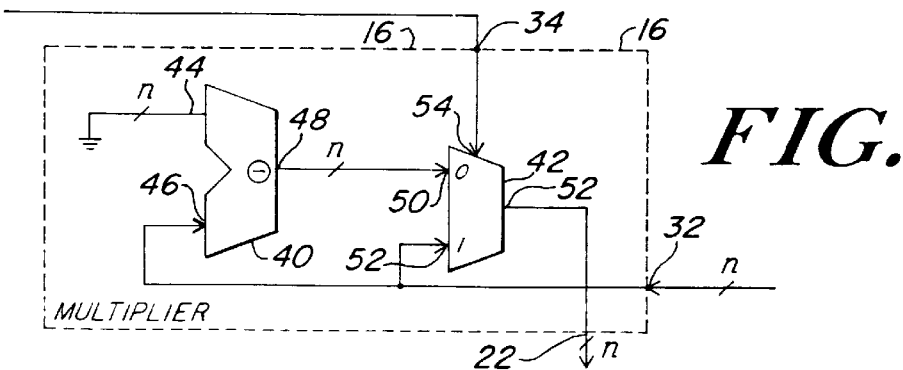
FIG. 3 is a block diagram of an asymmetric multiplier used in the square root circuit of FIG. 1.

The multiplier 16 has a first input 32 coupled to the output of the interpolator 30 and a second input 34 coupled to the output of the modulator 12. The multiplier 16 has an output which is fed as the feedback signal to the modulator 12 on bus 22. The multiplier 16 is shown in more detail in FIG. 3 to include an adder 40 and a selector 42. The adder 40 is a standard 2's complement adder 40 functioning as a negative operator. The adder 40 has a first input 44, a second input 46 and an output 48. The adder 40 is configured such that the output signal is equal to an input signal at the first input 44 minus an input signal at the second input 46. The first input 44 of the adder 40 is coupled to a reference potential, here ground, and the second input 46 of the adder 40 is coupled to the first input 32 of the multiplier 16 to receive the n-bit data stream produced by the interpolator 30. Thus, since the input signal at input 44 of the adder 40 is essentially equal to zero, the output signal 48 of adder 40 is equal to the negative of the n-bit data stream at input 42. As noted above, here 2's complement numeric coding is used. If, however, 1's complement numeric coding were used, the operation of the adder 40 would be simplified because the negative of the n-bit signal can be obtained by inverting each of the bits of the n-bit signal.

The multiplexer 42 of the multiplier 46 is a standard two-to-one multiplexer and may be implemented in one of many known ways using transfer gates, two-input AND gates or NOR gates. The multiplexer 42 has three inputs 50, 52 and 54 and one output 56. Input 50 is coupled to the output of the adder 48 to receive the n-bit signal corresponding to the negative of the n-bit signal output from the interpolator 30. Input 52 of multiplexer 42 is coupled to the first input 32 of the multiplier 16 to receive the n-bit signal output from the interpolator 30, and input 54 of the multiplexer 42 is coupled to the second input 34 of the multiplier 16 to receive the -bit data stream output from the modulator 12.

The multiplexer 42 provides either the input signal at the first input 50 of the multiplexer 42 or the input signal at the second input 52 of the multiplexer 42 as the output signal from the multiplexer 42 at output depending on a value of the signal received at input 54.

As discussed above, the 1-bit data stream output from the modulator 12 has a logical value equal to "1" or "−1". When the output of the modulator 12 has a logical value of "+1", the multiplexer 42 selects the signal at the second input 52 at the output (i.e. bus 22) of the multiplexer 42, and when the logical value of the output signal of the modulator 12 has a value of "−1", the multiplexer 42 selects the input signal at the first input 50 as the multiplier 16 output signal at the output on bus 22. Thus, the output signal of the multiplexer 42 is equal to the 1-bit output of the modulator 12 multiplied by the n-bit output of the interpolator 30.

The sigma-delta modulator 12 has a gain selected to, in a steady state condition, enable the feedback loop 18 to rive the feedback signal on bus 22 towards the input signal X, with the feedback signal, in the steady state being driven to $Y^2=X$, where X is the input signal. Thus, in the steady state, with a large modulator 12 gain provided by the integrator 24, in the steady state the output of the modulator 12 either directly, or at the output of the filter 14 will be equal to:

$$\sqrt{X}$$

As discussed above, the data rate of the 1-bit data stream output of the modulator 12 may be greater than the data rate of the n-bit data stream output from the interpolator 30. When this occurs, there is an implied, here, for example, zero-order interpolation operating at the input of the multiplexer 42 that effectively interpolates (or up samples) the output of the interpolator 30 to the sample rate of the modulator 12. The n-bit output data stream, provided at output of the multiplexer 42, is at the data rate of the 1-bit data stream received at the input 34 of the multiplexer 42.

It is should be noted that it is also possible to combine the low-pass decimation filter and interpolator into one filter. Using separate elements offers the advantage that one can have different sample rates for the modulator and the output value, Y represents the square root of the input signal, X.

Other embodiments are within the spirit and scope of the appended claims. For example, other non-linear functions may be provided using other non-linearities in the feedback, such as, for example, a Taylor series or sum of the square term shown, or a cube term, etc. Further, the modulator need not be a first-order implementation; any order may be used as long as it is stable over the expected signal range which the square root function is to normally operate.

What is claimed is:

1. Apparatus for processing an input signal, comprising:
   a sigma-delta modulator, said sigma-delta modulator including first and second inputs, said first input receiving the input signal; and
   a non-linear circuit coupled to said sigma delta modulator, said non-linear circuit producing a feedback signal, said feedback signal being a non-linear function of the output of said sigma-delta modulator, said feedback signal being fed into said second input of said sigma-delta modulator, said feedback signal being distinct from the input signal.

2. A method for processing an input signal, comprising the steps of:
   (a) modulating an input signal using a sigma-delta modulator to produce a modulated input signal;
   (b) performing a non-linear function upon the modulated input signal to produce a feedback signal, the feedback signal being a non-linear function of the modulated input signal, the feedback signal being distinct from the input signal; and
   (c) feeding back the feedback signal to the sigma-delta modulator.

3. Apparatus for producing a signal representative of the square root of an input signal, such apparatus, comprising:
   a feedback loop having:
      a sigma-delta modulator fed by the input signal and a feedback signal, the output of the sigma-delta modulator is a stream of m-bit digital words;
      a filter for converting the stream of m-bit digital words produced by the sigma-delta modulator into a corresponding stream of n-bit digital words;
      a multiplier fed by the n-bit and m-bit streams of digital words, the multiplier producing a series of digital words, each one of the digital words representing the product of one of the n-bit digital words and a one of the n-bit digital words, the series of digital words produced by the multiplier being fed to the sigma-delta modulator as the feedback signal.

4. The apparatus recited in claim 3 wherein such sigma-delta modulator has a gain selected to, in a steady state condition, enable the feedback loop to drive the feedback signal towards the input signal, with the feedback signal, in the steady state being driven to $Y^2=X$, where X is the input signal.

5. Apparatus for processing an input signal, comprising:
   a feedback loop having:
      a sigma-delta modulator fed by the input signal and a feedback signal, the output of the sigma-delta modulator is a stream of m-bit digital words;
      a filter for converting the stream of m-bit digital words produced by the sigma-delta modulator into a corresponding stream of n-bit digital words;
      a non-linear processing unit fed by the n-bit and m-bit streams of digital words, the non-linear processing unit producing a series of digital words, each one of the digital words representing a non-linear combination of one of the n-bit digital words and one of the n-bit digital words, the series of digital words produced by the non-linear processor being fed to the sigma-delta modulator as the feedback signal.

6. Apparatus for producing a signal representative of the square root of an input signal, such apparatus, comprising:
   a feedback loop comprising:
      a modulator having: a differencing network for producing a signal representative of the difference between the input signal and a feed back signal; an integrator fed by the difference signal; and comparator fed by the integrator, for producing a series of bits representative of the difference between the input signal and the feedback signal;
      a decimation filter fed by the series of bits for converting the sets of the series of bits into a corresponding sequence of n bit digital words; and a multiplier fed by the series of bits and the sequence of n bits digital words for producing the feedback signal.

7. The apparatus recited in claim 6 wherein the multiplier produces a sequence of digital words in response to the multiplication of the series of bits and the sequence of n bits digital words.

8. The apparatus recited in claim 7 wherein the comparator produces a series of single bits, each bit being representative of a difference between an output of the integrator and a predetermined level.

9. The apparatus recited in claim 8 wherein the multiplier produces a sequence of n bit digital words in response to the multiplication of the series of single bits and the sequence of n bits digital words.

* * * * *